US009874260B2

United States Patent
Blochlinger et al.

(10) Patent No.: US 9,874,260 B2
(45) Date of Patent: Jan. 23, 2018

(54) CASE WITH INTEGRATED STAND ACTIVATED BY PRESSURE

(71) Applicant: Otter Products, LLC, Fort Collins, CO (US)

(72) Inventors: Alfred Blochlinger, Melbourne (AU); Andrew C. Crawford, Melbourne (AU); Lucas B. Weller, Fort Collins, CO (US); Troy Nyssen, Melbourne (AU)

(73) Assignee: Otter Products, LLC, Fort Collins, CO (US)

( * ) Notice: Subject to any disclaimer, the term of this patent is extended or adjusted under 35 U.S.C. 154(b) by 426 days.

(21) Appl. No.: 14/558,391

(22) Filed: Dec. 2, 2014

(65) Prior Publication Data

US 2015/0156905 A1    Jun. 4, 2015

Related U.S. Application Data

(60) Provisional application No. 61/910,958, filed on Dec. 2, 2013.

(51) Int. Cl.
| | |
|---|---|
| *B65D 25/24* | (2006.01) |
| *F16F 1/02* | (2006.01) |
| *H04M 1/04* | (2006.01) |
| *H04M 1/18* | (2006.01) |

(52) U.S. Cl.
CPC ............ *F16F 1/027* (2013.01); *H04M 1/04* (2013.01); *H04M 1/185* (2013.01)

(58) Field of Classification Search
CPC .. A45C 2011/002–2011/003; A45C 2013/025; F16F 1/027; H04M 1/04; H04M 1/185; G06F 1/1628

USPC ............ 206/45.2, 45.24, 235, 320; 248/549; 361/679.01; 455/575.1, 575.8
See application file for complete search history.

(56) References Cited

U.S. PATENT DOCUMENTS

| | | | | |
|---|---|---|---|---|
| 3,179,891 A | * | 4/1965 | Sharma | G04B 47/006 206/235 |
| 4,094,309 A | * | 6/1978 | Grzenia | A61B 5/0416 174/133 R |
| 5,768,094 A | | 6/1998 | Merkel | |

(Continued)

OTHER PUBLICATIONS

"Case Mate Snap iPhone 4 Case", published Mar. 6, 2012, http://gadgetsin.com/case-mate-snap-iphone-4-case.htm (Accessed on Dec. 11, 2013), (2 pages).

(Continued)

*Primary Examiner* — Luan K Bui

(57) ABSTRACT

This disclosure relates generally to stands and enclosures for an electronic device. The apparatus can include an enclosure or a housing for receiving an electronic device and protect the device from damage resulting from impact or exposure to liquids. The stand may include one or more bi-stable springs connected to the rear surface of the housing by an attachment feature, such as slides or an anchor. The bi-stable spring portion of the stand has a straight or inactive configuration and a curled activated configuration. When a user places pressure on a straightened bi-stable spring, the bi-stable spring curls outward away from the enclosure and can act as a stand for the electronic device. The stand may be removably or permanently affixed to the enclosure.

20 Claims, 12 Drawing Sheets

(56) References Cited

U.S. PATENT DOCUMENTS

| | | | |
|---|---|---|---|
| 7,347,019 B1* | 3/2008 | Shaw | F16F 1/025 40/607.01 |
| 7,431,161 B2* | 10/2008 | Carlino | B65D 69/00 206/235 |
| 8,245,843 B1* | 8/2012 | Wu | H01M 10/465 206/320 |
| 8,302,769 B2* | 11/2012 | Justiss | A45F 5/02 206/320 |
| 8,517,172 B1* | 8/2013 | Chang | G06F 1/1626 206/320 |
| 8,763,795 B1 | 7/2014 | Oten et al. | |
| 9,013,863 B2* | 4/2015 | Hsu | H05K 7/1401 206/320 |
| 2004/0266502 A1 | 12/2004 | Holtorf et al. | |
| 2008/0017678 A1* | 1/2008 | Anderson | A44C 5/003 224/221 |
| 2010/0258601 A1* | 10/2010 | Thrope | A45C 1/00 224/267 |
| 2011/0297566 A1* | 12/2011 | Gallagher | F16M 11/105 206/320 |
| 2013/0044215 A1 | 2/2013 | Rothkopf et al. | |
| 2013/0134061 A1* | 5/2013 | Wu | G06F 1/1626 206/320 |
| 2013/0214661 A1 | 8/2013 | McBroom | |
| 2015/0003629 A1* | 1/2015 | Killian | H03G 3/02 381/77 |
| 2015/0109527 A1* | 4/2015 | Tchakerian | H04N 5/23219 348/376 |
| 2015/0184799 A1* | 7/2015 | Whitney | F16M 13/022 29/428 |

OTHER PUBLICATIONS

"Case-Mate Expands Spring 2012 Collection to Reflect Growing Diversity of Mobile Consumer", Press Release issued Jan. 9, 2012, http://www.case-mate.com/images/press/releases/Case-Mate-Reveals-Spring-2012-Collection_CES-2012.pdf, (2 pages).

Crook, Jordan "Oh, Snap! Case-Mate Blends an iPhone Case With a SnapBracelet", Oct. 29, 2012, http://techcrunch.com/2012/10/29/oh-snap-case-mate-blends-an-iphone-case-with-a-snap-bracelet/ (Accessed Dec. 9, 2013), (6 pages).

* cited by examiner

CASE WITH INTEGRATED STAND ACTIVATED BY PRESSURE

CROSS-REFERENCE TO RELATED APPLICATIONS

This application claims priority to U.S. Provisional Patent Ser. No. 61/910,958, filed Dec. 2, 2013, the entire contents of which are incorporated by reference herein.

FIELD

This disclosure relates generally to enclosures with integrated stands, such as encasements and housings for portable electronic devices.

BACKGROUND

Cases for portable electronic devices, such as smartphones and tablets have been known to include collapsible or removable stand elements that allow an encased device to be placed substantially upright on a flat surface, such as a tabletop or counter, thus allowing the screen of the device to be more easily viewed without being held upright by a user. It is desirable that such stand elements are easily collapsed or stowed when not in use and easily actuated when desired. The object of the present technology is to activate and deactivate the stand elements using a small amount of force and effort.

SUMMARY

In one aspect, an apparatus for encasing a mobile electronic device is disclosed. The apparatus includes an encasement having a front surface and a back surface, and is surround by a perimeter portion defined by a proximal end portion, a distal end portion, and opposing side portions. In some embodiments, the apparatus includes a flexible substrate having a straightened state and a curled state. In some embodiments, the flexible substrate is a bi-stable spring. In certain embodiments, an elastomeric material, such as silicone, covers the bi-stable spring. In certain embodiments, an attachment mechanism attaches the bi-stable spring to the back surface of the enclosure or encasement. The attachment mechanism may include a slot through which the bi-stable spring is inserted. In certain embodiments, the anchor includes a flanged post, and the bi-stable spring includes a hole configured to receive the flanged post.

In another aspect, an enclosure for an electronic device is disclosed. The enclosure includes an encasement with a rear surface and a perimeter portion. The perimeter portion is defined by a proximal end portion, a distal end portion, and a plurality of opposing side portions. The encasement also includes a first attachment element on the rear surface of the encasement. A stand is attached to the encasement and includes a bi-stable springing element having front and rear surfaces, as well as a middle region positioned between a first end region and a second end region. The middle region is at least partially encased by a material that maintains the middle portion of the bi-stable springing element in a single configuration. The middle region also includes a second attachment element on the rear surface of the stand, and the second attachment element is attached to the first attachment element.

In yet another aspect, a removable stand for an enclosure is disclosed. The removable stand includes a bi-stable springing element with a front surface, a rear surface, a first end region, a second end region, and a middle region positioned between the first end region and the second end region. The middle region of the removable stand is at least partially encased by a material such that the encased portion of the removable stand is rigidly maintained in a single configuration. The removable stand also includes an attachment region on the rear surface of the middle region that is removably attachable to a second attachment region on an enclosure.

In still another aspect, an enclosure for an electronic device is disclosed that includes multiple bi-stable springing elements. The enclosure includes an encasement having a front surface, a rear surface, and a perimeter portion. The perimeter portion of the encasement is defined by a proximal end portion, a distal end portion, and a plurality of opposing side portions. The encasement includes a first attachment element on the rear surface of the encasement, and a stand attached to the encasement. The stand includes two or more bi-stable springing elements. Each bi-stable springing element has a front surface, a rear surface, a first end region, and a second end region. The stand also includes a middle region that has a material attached to each of the second end regions of the bi-stable springing elements. The rear surface of the stand's middle region also includes a second attachment element that is attached to the first attachment element.

In another aspect, a removable stand for an enclosure is disclosed herein. The removable stand includes two or more bi-stable springing elements, each bi-stable springing element having a front surface, a rear surface, a first end region, and a second end region. The stand also includes a middle region comprising a material attached to each of the second end regions of the bi-stable springing elements. The rear surface of the middle region includes an attachment element that is removably attachable to a second attachment region on an enclosure.

The summary of the invention described above is non-limiting and other features and advantages of the invention will be apparent from the following detailed description of the invention, and from the claims.

BRIEF DESCRIPTION OF THE FIGURES

FIG. 2A shows the spring in a straight position, and FIG. 2B shows the spring in an activated or curled position.

DETAILED DESCRIPTION OF THE DISCLOSURE

The present disclosure is directed to stands and enclosure and stand systems for a mobile electronic device that incorporates a stand having a bi-stable spring on the rear surface of the encasement. A user can either leave the bi-stable spring straight and perpendicular to the rear surface of the device case, or can activate or curl the bi-stable spring by applying some force to the spring. The enclosure can then be maintained in an upright or semi-upright position by leaning the enclosure against the bi-stable spring. Enclosures described herein may be housings for electronic device components or encasements for electronic devices already contained in a housing, such as smartphones, tablets, GPS receivers, and the like.

The term "about" as used herein in reference to quantitative measurements, refers to the indicated value plus or minus 10%.

Figure 1A:
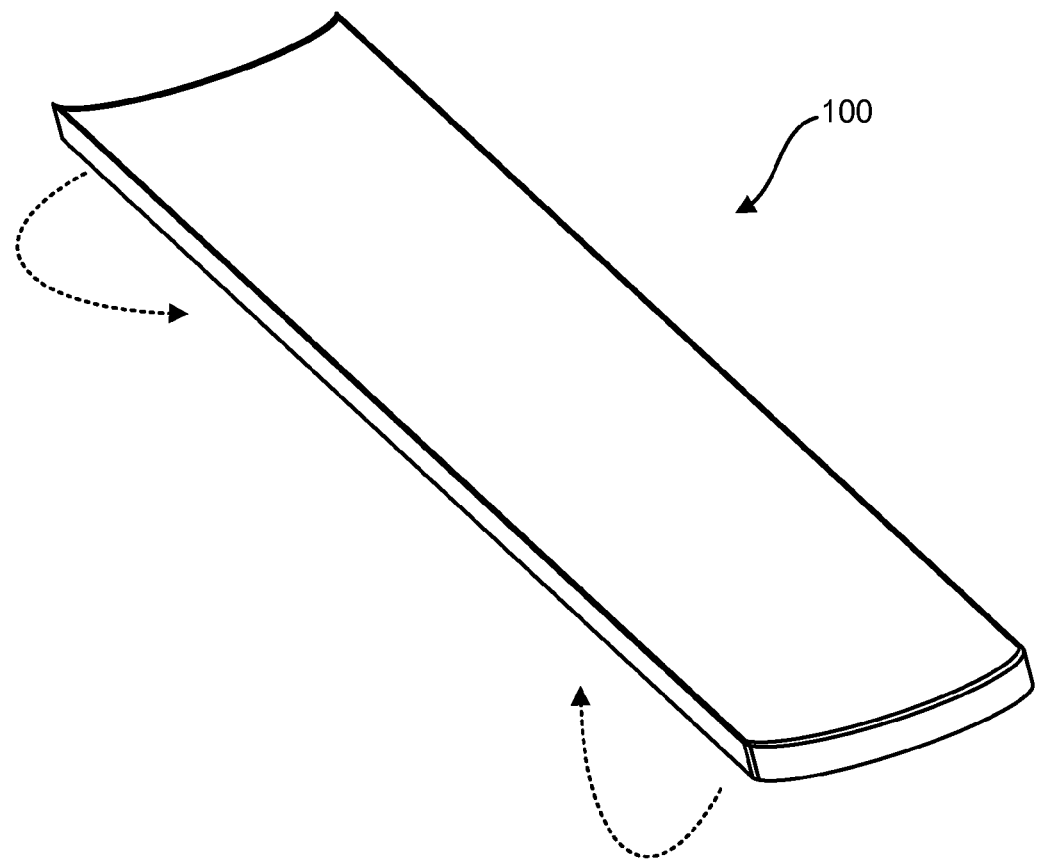
FIG. 1A shows a perspective view of a bi-stable spring in a straightened, or inactivated, state.
Figure 1B:
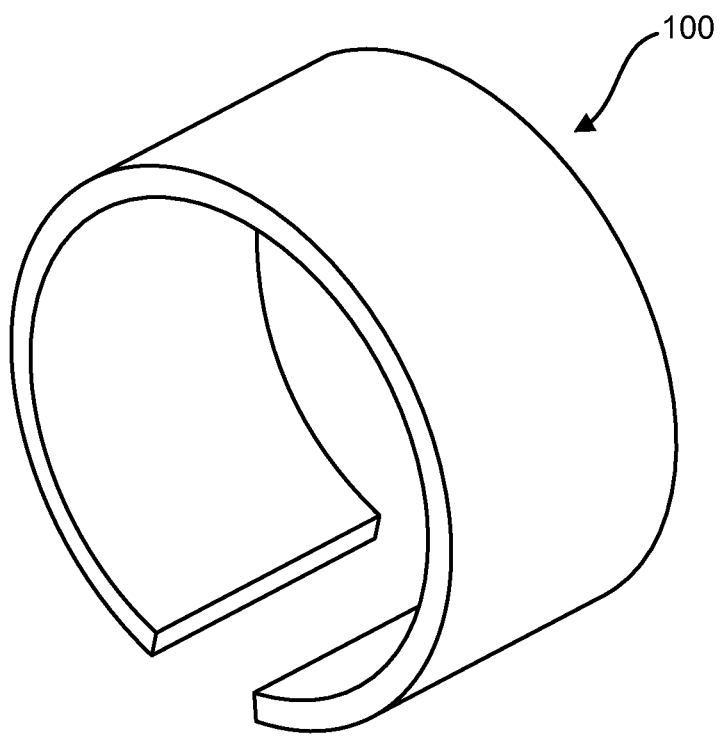
FIG. 1B shows a perspective view of a bi-stable spring in a curled, or activated, state.

Enclosures described herein utilize a stand having a bi-stable springing element that a user can position into either of two different stable states. In some embodiments, a bi-stable spring has an elongated structure with a shallow arch across the short width of the spring. FIG. 1A shows a perspective view of an exemplary bi-stable springing element 100. The springing element is flexible, often made of one or more layers of thin metal. The bi-stable springing element has two different equilibrium positions. A first equilibrium position is the straight or inactivated position shown in FIG. 1A. When a sufficient portion of the shallow arch is depressed or flattened, the spring can jump into a second equilibrium position in which each of the ends of the bi-stable springing element curl inward (see dashed arrows in FIG. 1A; see FIG. 1B). This dual equilibrium position behavior is commonly utilized for so-called slap bracelets, which are layered, flexible steel bands covered by fabric or an elastomer, such as silicone. For example, when used as a slap bracelet, the slap bracelet is slapped against a wrist or ankle with sufficient force to disrupt the shallow arch in the straightened position and allow the slap bracelet to deform and achieve a curled position. The bi-stable element can have other shapes and configurations than those shown in FIGS. 1A-B. For example, the ends of the springing element may be rounded (e.g. FIG. 3A). The springing element may be configured as a circle, oval, or a regular or irregular polygon (e.g. a triangle, rectangle, square, pentagon, etc.).

Figure 2A:
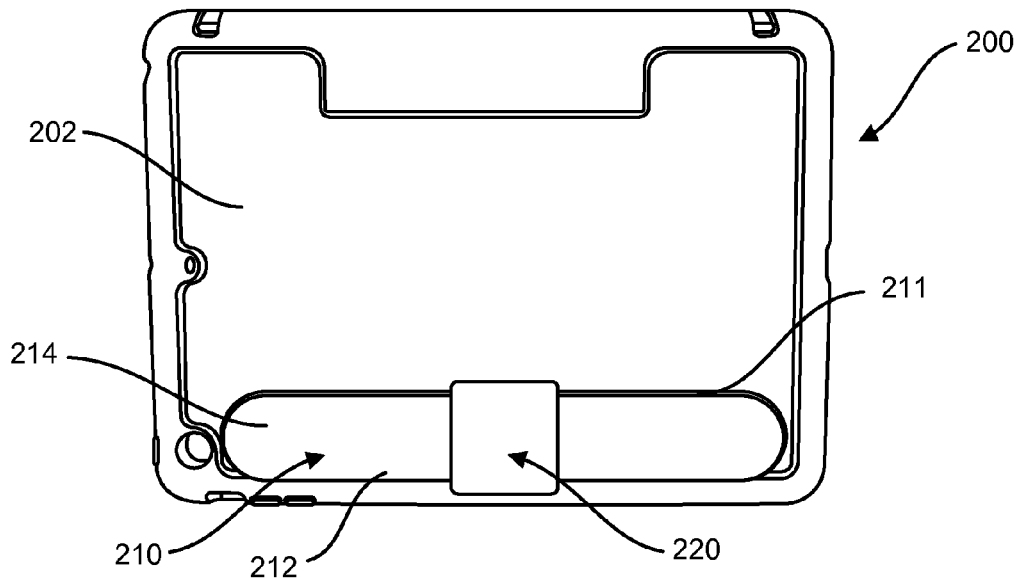
FIGS. 2A and 2B depict rear plan views of a tablet case with a connected bi-stable spring.

FIG. 2A depicts a rear plan view of an exemplary tablet case 200 that can at least partially encase an electronic tablet having a viewable display. In some embodiments of encasements disclosed herein, the encasement may be for a smartphone, a monitor, or an electronic device having a segmented display. Tablet case 200 may be made of any semi-rigid or rigid material, alone or in combination, e.g. plastics, resins, wood, metal, or other materials. In some embodiments, tablet case 200 provides drop protection and/or waterproof protection to an electronic tablet encased within.

Tablet case 200 includes a bi-stable springing element 210 held in place by an anchor or attachment element 220. In some embodiments, the attachment element 220 may be co-molded to the rear surface 202 of case 200, or it may be adhered as a separate unit. Attachment element 220 includes a slot (not visible) configured to optionally allow the springing element 210 to slide in and out of the anchor, parallel to the rear surface 202 of case 200. The slot has sufficient clearance from the rear surface 202 of case 200 so as to allow the springing element 210 to move between the two different equilibrium positions (a straight position including a shallow arch, and an activated or curled position having no arch). In some embodiments, springing element 210 has no clearance to allow the section of the springing element held in place by the slot, and that region of the springing element is held in a straight position. In certain embodiments, the spring may be at least about 0.006 inches thick, however other thicknesses are possible. Bi-stable springing element 210 may be coated with an elastomer such as silicone, or covered by one or more layers of fabric. In some embodiments, springing element 210 may be coated with an elastomeric cushion material, such as neoprene, and then coated with a second elastomeric layer such as silicone, or covered with fabric. Springing element 210 is inserted through attachment element 220 such that the shallow arch curves away from the rear surface 202 of the encasement 200, exposing an outer surface 214. An inner surface 213 (not visible in FIG. 2A) is positioned proximate rear surface 202 of case 200. Springing element 210 also includes an inner edge 211 and an outer edge 212.

Figure 2B:
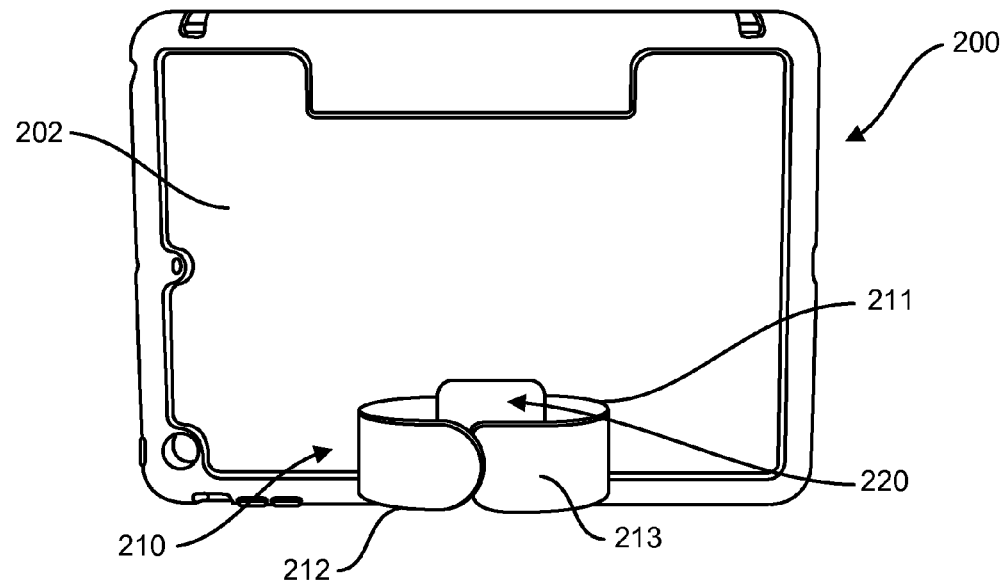

When a user applies sufficient force to the shallow arch of bi-stable springing element 210, bi-stable springing element 210 curls outward, away from rear surface 202 of case 200 and exposing inner surface 213 of springing element 210. FIG. 2B depicts an activated or curled bi-stable springing element 210. When bi-stable element 210 is activated, the case may be set down on a substantially horizontal surface, such that outer edge 212 of the curled spring 210 rests against a substantially horizontal surface, such as a tabletop, thus supporting the case in an upright position that is not parallel with the tabletop. A user can return springing element 210 to an inactivated or straightened state by applying force against each of the end regions 215a and 215b and straightening the bi-stable springing element 210 against the rear surface 202 of case 200 until springing element 210 is in a stable straightened state.

Figure 2C:
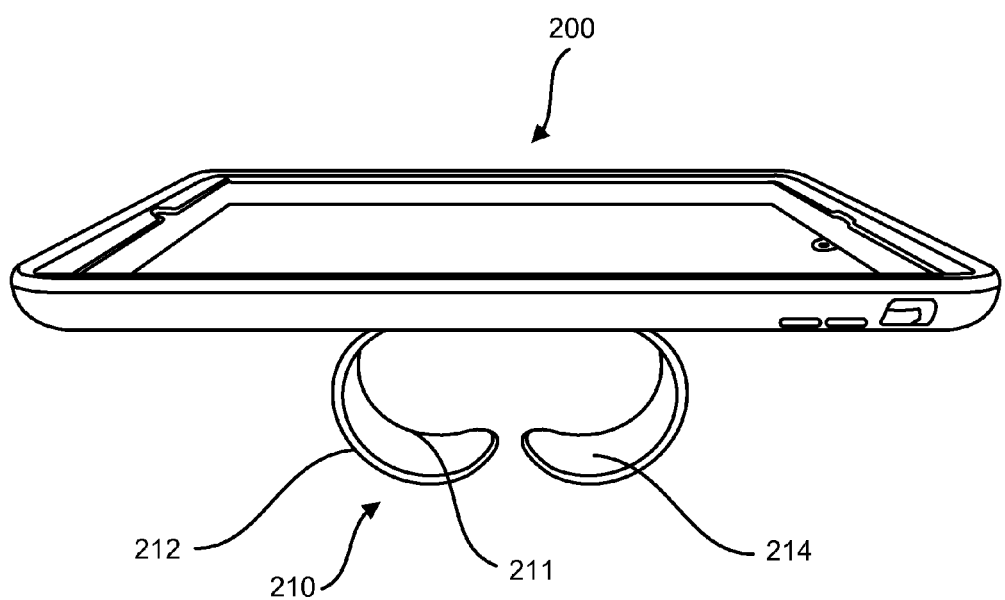
FIG. 2C shows a perspective view of a case with a bi-stable spring in activated or curled position.

FIG. 2C depicts a perspective view of case 200 facing towards outer edge 212 of activated bi-stable spring 210. FIG. 2C shows a second orientation of case 200 in which the case is angled slightly upward, relative to a substantially horizontal surface. The angle of the case is much farther from perpendicular than that of FIG. 2B. The inner surface 213 (not visible, see FIG. 2B) of spring 210 partially contacts the horizontal surface, and the spring maintains the case in a partially upright position.

Figure 2D:
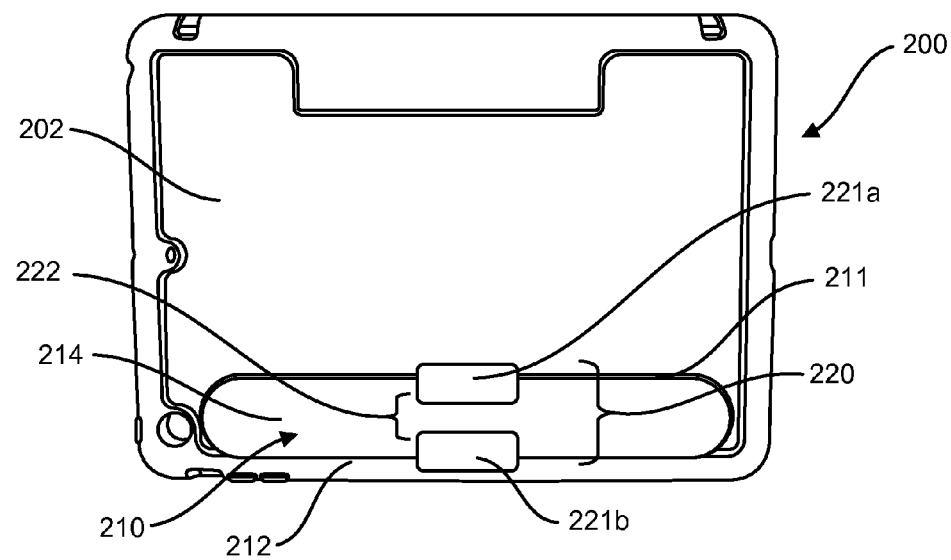
FIG. 2D shows a case attached to a bi-stable spring and an alternative embodiment of an attachment mechanism for attaching the bi-stable spring to the rear surface of the encasement.

Attachment element 220 may have alternative configurations. For example, FIG. 2D shows case 200 with attachment element 220 configured with a gap 222 that partially exposes the bi-stable spring. Attachment arms 221a and 221b act to hold springing element 210 in place. In the embodiment depicted, attachment element 220 extends outward away from the plane of rear surface 202. In certain embodiments, gap 222 may be an opening formed in rear surface 202. Attachment arms 221a and 221b extend into the opening, allowing springing element 210 to be threaded underneath attachment arms 221a and 221b, directly through rear surface 202 of case 200. In some embodiments, attachment arms 221a-b may interface with a ledge or depression proximate the perimeter edge of the bi-stable spring. For example, FIG. 2G shows a schematic side view of a bi-stable spring 224 that has ledges 223a and 223b formed on at least a portion of the perimeter edge. Ledges 223a-b can slide underneath attachment arms 221a-b, and are held in place between the attachment arms 221a-b and rear surface 202.

In some embodiments, the bi-stable spring may snap-fit in between two or more rigid yet stiff flexible protrusions on the rear surface of the enclosure to maintain the spring on the enclosure. Exemplary attachment features may include cantilever hooks or compressive hooks.

Some embodiments of the attachment element may include use of a magnet to aid in alignment, or as the primary means of attaching the springing element to the enclosure. For example, a magnet may be part of an attachment element in a stand, and a second magnet or ferromagnetic metal may be positioned on or in the rear surface of the enclosure (or vice versa).

Figure 2E:
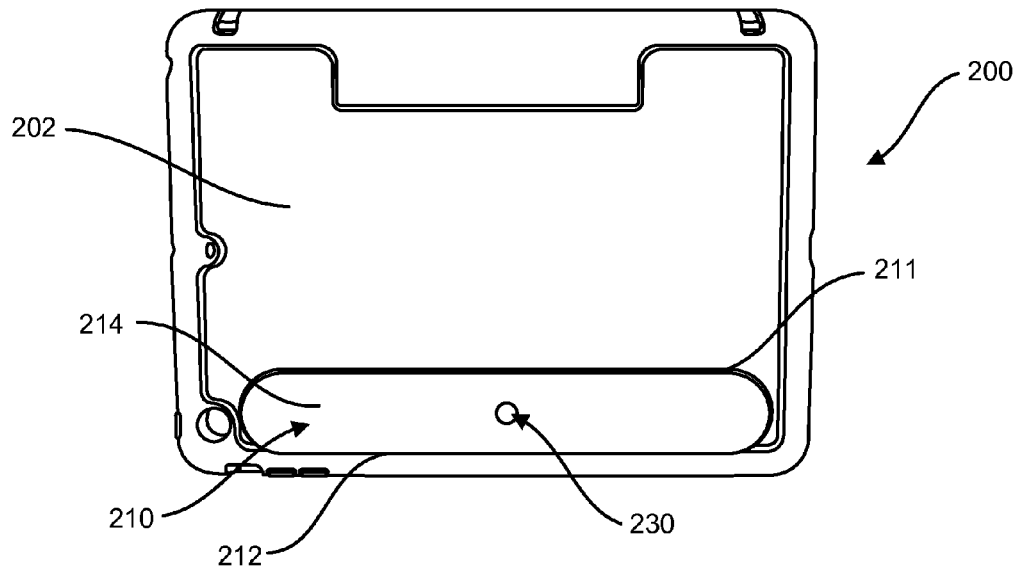
FIG. 2E shows a case with a bi-stable spring and a flanged post configured to anchor the spring.
Figure 2F:
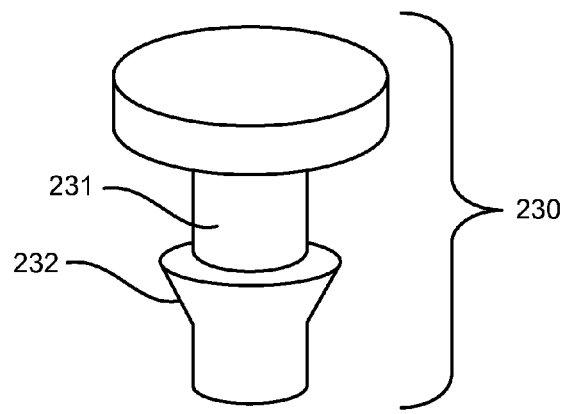
FIG. 2F shows a perspective view of the flanged post of FIG. 2E.
Figure 2G:
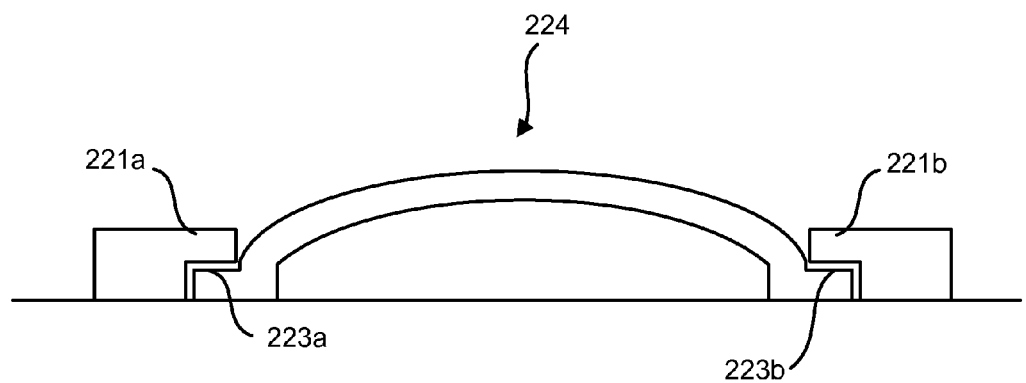
FIG. 2G shows a schematic side view of a bi-stable spring held in place with attachment arms on the rear surface of an encasement.

FIG. 2E shows case 200 having an attachment element configured as a flanged post 230. Flanged post 230 extends through a hole in bi-stable springing element 210, wherein the flange is configured to have an outer diameter slightly larger than the inner diameter of the hole. The flange is made from a flexible or elastomeric material that can be forced through the hole and permanently or removably maintained on the flanged post. FIG. 2F shows a perspective view of flanged post 230, which includes post 231 and flange 232. Flanged post 230 has a length that allows it to be inserted through a hole in the rear surface 202 of case 200, allowing removable or permanent attachment of bi-stable springing element 210 to case 200. In some embodiments, more than one flanged post and hole may be utilized to secure bi-stable springing element 210 to case 200.

In certain embodiments, hook and loop fasteners on a flexible backing may be adhered to case 200 proximate the bi-stable spring 210. For example, a hook fastener may be adhered to outer surface 214 near an end portion of the bi-stable spring 210, and a loop fastener on a flexible backing may be adhered to the case proximate the hook fastener, such that the loop fastener may secure the end portion of the bi-stable springing element 210 and prevent accidental activation. In some embodiments, one or more clips may used to prevent accidental activation of the bi-stable springing element 210. The arms of the clip are positioned on either side of a portion of case 200 and extend far enough to at least partially cover bi-stable spring 210, thus preventing accidental activation. The clip is then removed when a user wants to activate the bi-stable springing element and elevate the case.

Figure 3A:
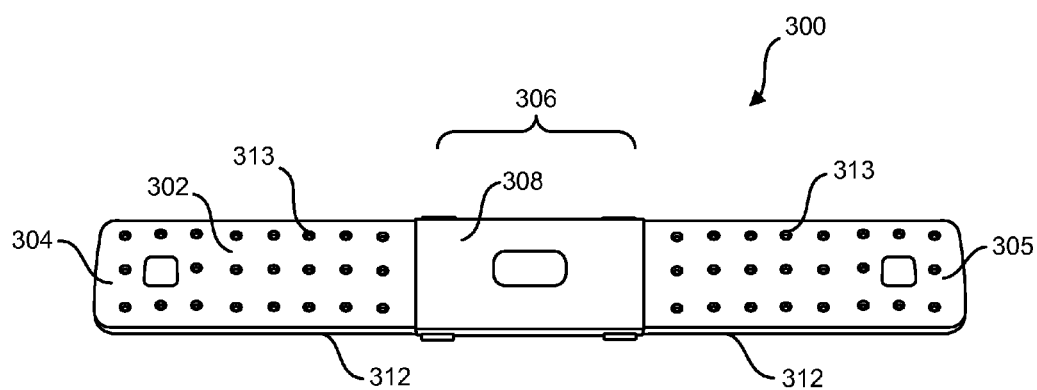
FIGS. 3A and 3B show plan views of the front and rear surfaces of an embodiment of a removable stand.

FIG. 3A depicts a view of another embodiment of a removable stand 300 incorporating a bi-stable spring. Removable stand 300 has a front surface 302 and includes a single bi-stable springing element 312 with a first end portion 304, and a second end portion 305. Each of the first end portion 304 and second end portion 305 are partially covered by an elastomeric silicone, with holes 313 exposing the surface of springing element 312 underneath. Other elastomeric materials may be used to cover end portions of a springing element, such as neoprene or other polymers. A rigid plastic encases middle portion 306 of bi-stable springing element 312, forming an attachment element 308. In certain embodiments, either rigid or semi-rigid materials may be used to encase middle region 306, such as plastics, compressible foams, etc. Bi-stable springing element 312 of FIG. 3A is in a straightened or uncurled state, with the spring forming an arch along its length. Attachment element 308 is formed around middle portion 306 of stand 300 and maintains middle portion 306 in a straightened state.

Figure 3B:
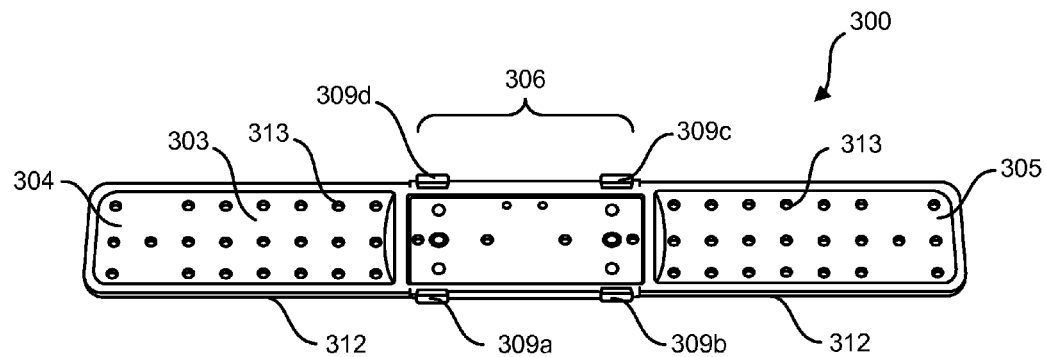
Figure 3C:
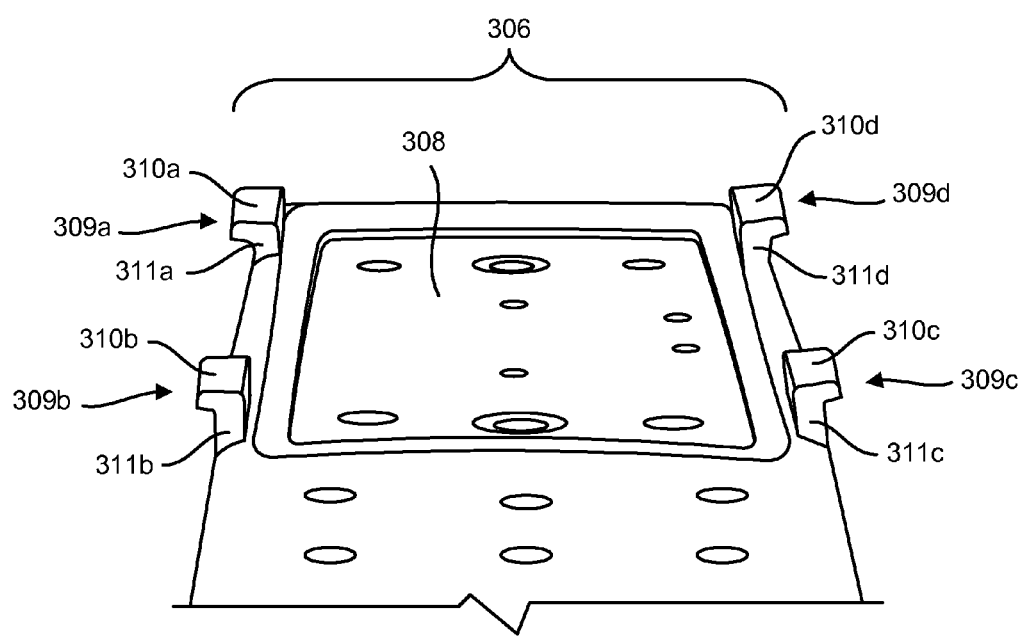
FIG. 3C depicts a close-up perspective view of an attachment element on the rear surface of a stand.

FIG. 3B is a view of rear surface 303 of removable stand 300, including attachment element 308. Attachment element 308 includes four slide protrusions 309a, 309b, 310c, and 310d positioned on edges of the rear surface 303 of stand 300. FIG. 3C shows a close up perspective view of the slide protrusions 310a-d of stand 300. In the depicted embodiment, the slide protrusions have a L-shape, each slide protrusion having an alignment wall 311a-d and a single securing arm 310a-d. In some embodiments, one or more of the slide protrusions 309a-d may have additional securing arms to form a T-configuration (see, e.g., FIG. 3F). In some embodiments, the entire stand may be overmolded with an elastomeric material after middle region 306 is encased by rigid or semi-rigid material. In some embodiments, rigid or semi-rigid material may be overmolded onto middle region 306 after elastomeric material has been attached to a springing element.

Figure 3D:
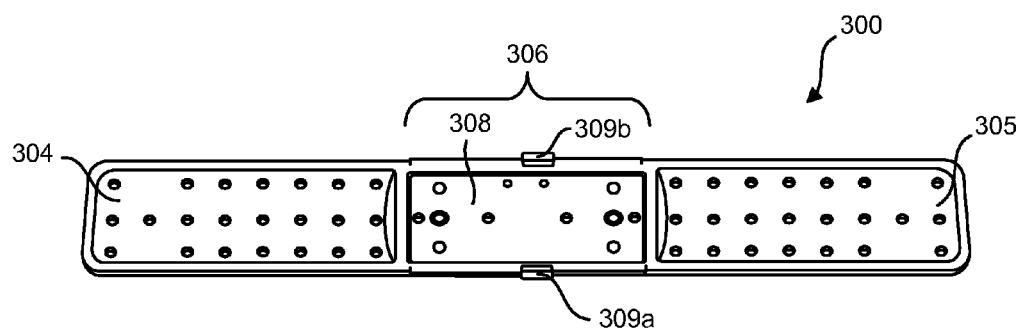
FIG. 3D shows an embodiment of a stand with two slide protrusions.
Figure 3E:
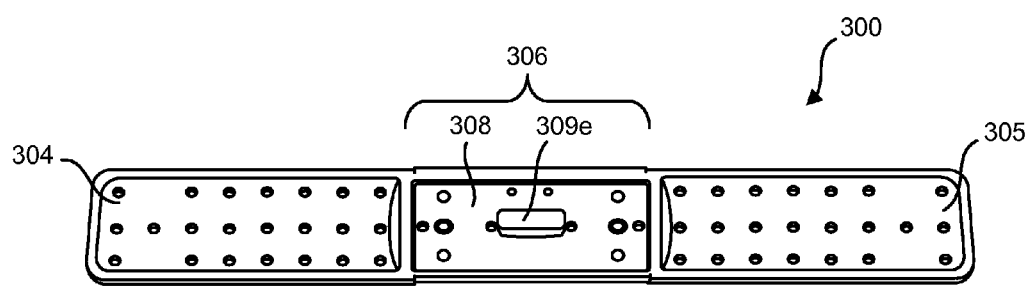
FIG. 3E shows an embodiment of a stand with a single slide protrusion.
Figure 3F:
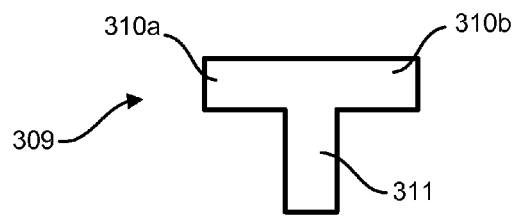
FIG. 3F shows a schematic side view of a T-shaped slide protrusion.

Slide protrusions may be used in a variety of configurations on stands disclosed herein. For example, FIG. 3D shows a stand 300 with two slide protrusions 309a-b positioned near the center of middle region 306. The number of slide protrusions may be two, three, four, five, six, or more. The size, length, and location of the protrusions may also be varied. For example, FIG. 3E shows a stand 300 with a single large T-shaped slide protrusion 309 positioned in the center of middle region 306. A side schematic view of a T-shaped slide protrusion 309 is illustrated in FIG. 3F, with securing arms 310a-b and alignment wall 311. In some embodiments, one or more slide protrusions may be arrayed across middle region 306. The geometry of the securing arms (when viewed in a plan view of the rear surface of a stand) may also vary, with circular, triangular, square, pentagonal, hexagonal, and other geometries possible.

Figure 3G:
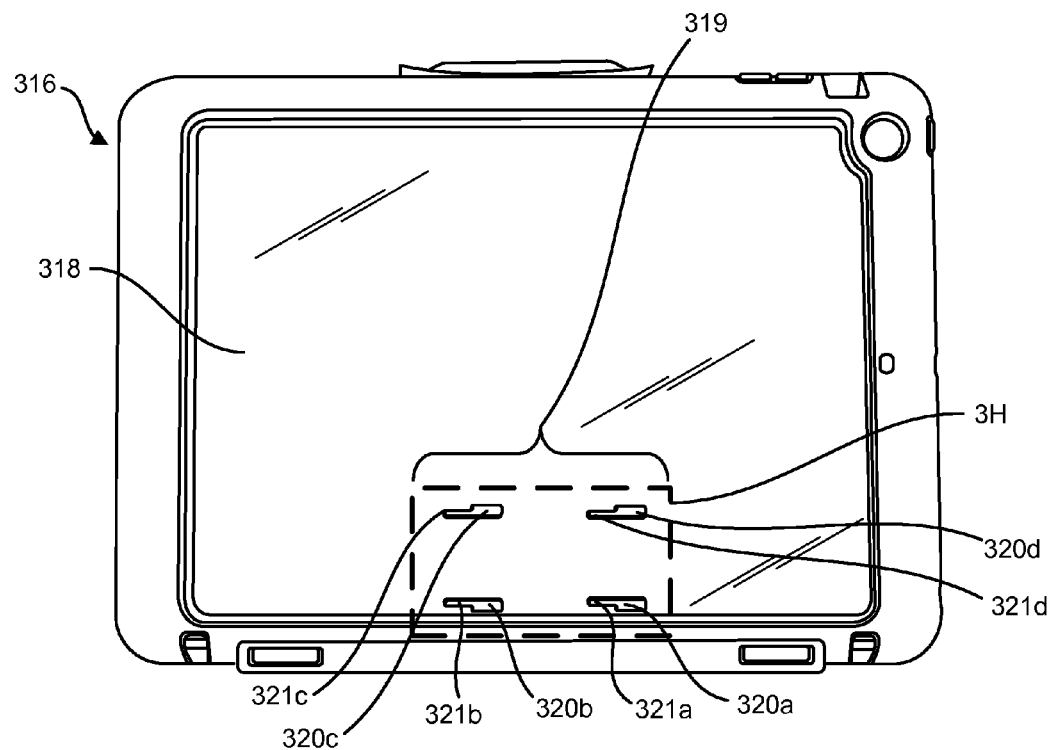
FIG. 3G shows an embodiment of an encasement with an attachment element that includes attachment apertures.
Figure 3H:
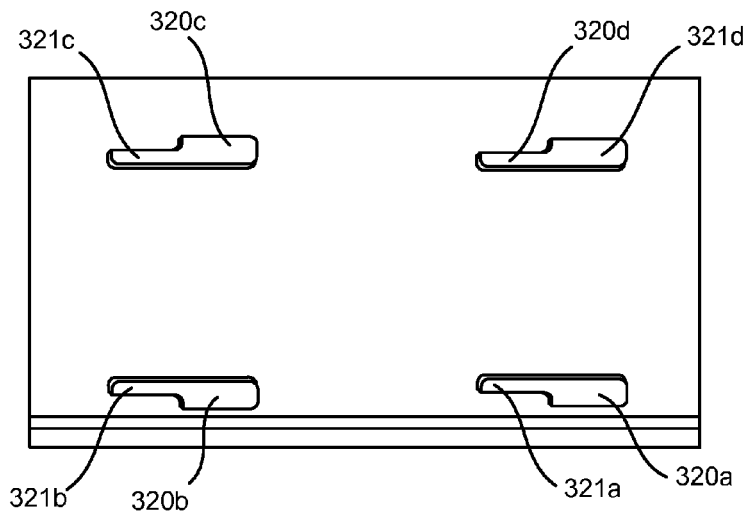
FIG. 3H shows an encasement of FIG. 3G with a removable stand attached.
Figure 3I:
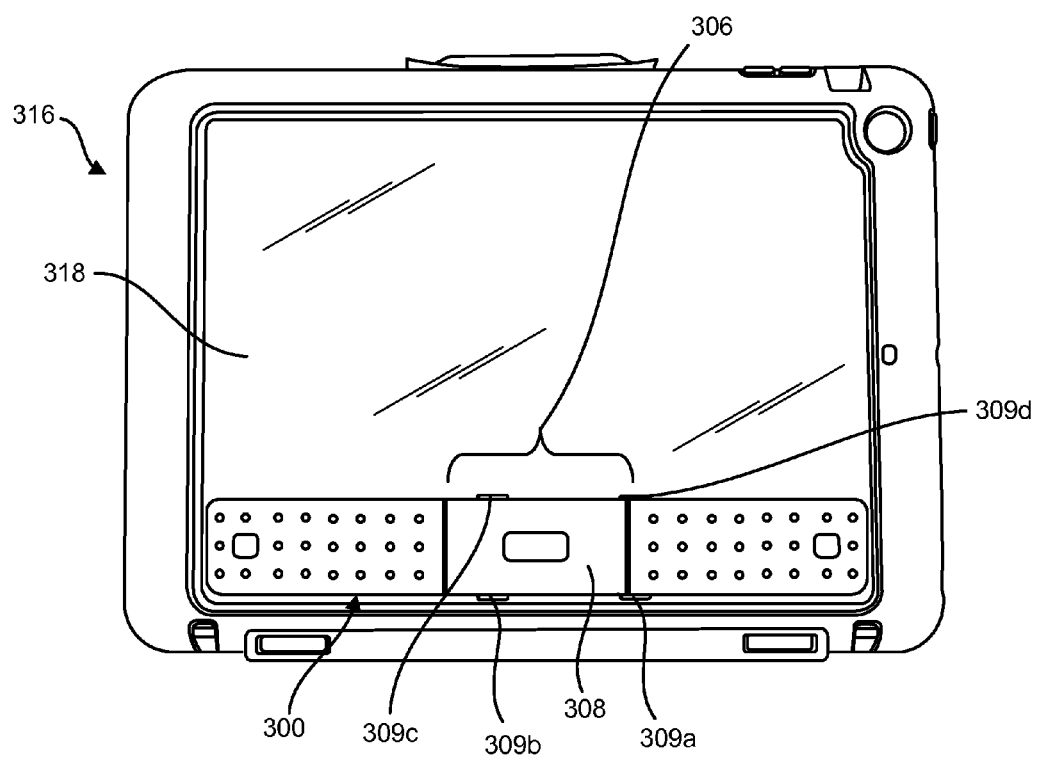
FIG. 3I shows a rear plan view of an encasement with an attached, inactivated stand.

FIG. 3G is a view of the rear surface 318 of case 316. Attachment region 319 includes slide apertures 320a, 320b, 320c, and 320d positioned near a perimeter of rear surface 318, and are configured to receive L-shaped slide protrusions 322a-d of stand 300. FIG. 3H is a closer view of dotted area 3H in FIG. 3G to more clearly depict slide apertures 320a-d, each of which corresponds with slide protrusions 309a-d. A user can attach stand 300 to attachment element 308 by aligning and inserting slide protrusions 309a-d with and through slide apertures 320a-d. Guide apertures 321a-d are contiguous with slide apertures 320a-d, and allow a user to slide stand 300 in one direction such that alignment wall 311 fills guide apertures and secures the securing arms against the inner surface of case 300. Together, the slide apertures and guide apertures form attachment apertures that can attach and secure attachment protrusions 309a-d. The shape and geometry of the guide apertures may be varied to accommodate the number, size, location, and geometry of the slide protrusions on the stand, as well as the securing arms (T-shaped, L-shaped, etc.).

In some embodiments of a stand and enclosure, the glide protrusions may be part of the attachment element for the enclosure and the glide and slide apertures may be part of the attachment element for the stand. The middle region of the stand may include slide apertures and glide apertures similar to those shown for an enclosure (see FIGS. 3G-3H). In such embodiments, the slide apertures and glide apertures on the middle region of the stand are positioned and formed to receive slide protrusions on an attachment element of an enclosure (similar to the glide protrusions shown on a stand in FIG. 3B).

Figure 3J:
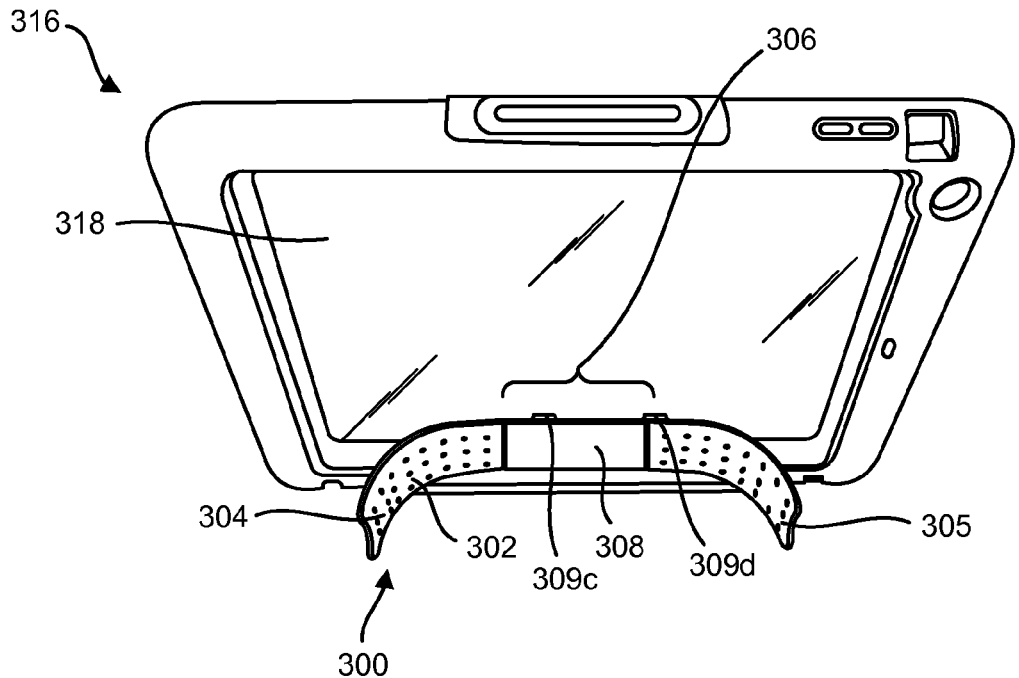
FIG. 3J shows a rear perspective view of an encasement with an attached, activated stand.
Figure 3K:
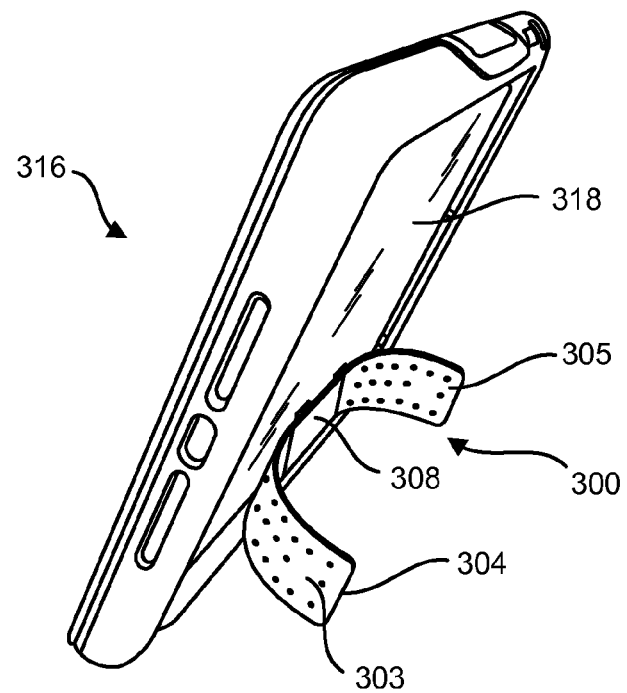
FIG. 3K shows a side perspective view of an encasement with an attached, activated stand.

FIGS. 3J and 3K shows rear perspective views of tablet case 316 and stand 300 when stand 300 is in an activated configuration. An edge 314 of stand 300 contacts a surface on which case 316 is positioned, and can maintain case 316 and a device it encases in a substantially upright position. In certain embodiments, case 316 may also be positioned on a flat surface such that rear surface 303 of the activated stand 300 contacts the flat surface and raises a portion of the rear surface of the case away from the flat surface (see, e.g. FIG. 2C).

The above figures may depict exemplary configurations for an apparatus of the disclosure, which is done to aid in understanding the features and functionality that can be included in the housings described herein. The apparatus is not restricted to the illustrated architectures or configurations, but can be implemented using a variety of alternative architectures and configurations. Additionally, although the apparatus is described above in terms of various exemplary embodiments and implementations, it should be understood that the various features and functionality described in one or more of the individual embodiments with which they are described, but instead can be applied, alone or in some combination, to one or more of the other embodiments of the disclosure, whether or not such embodiments are described and whether or not such features are presented as being a part of a described embodiment. Thus the breadth and scope of the present disclosure, especially in any following claims, should not be limited by any of the above-described exemplary embodiments.

Terms and phrases used in this document, and variations thereof, unless otherwise expressly stated, should be construed as open ended as opposed to limiting. As examples of the foregoing: the term "including" should be read to mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. Additionally, where a range is set forth, the upper and lower limits of the stated range are inclusive of all of the intermediary units therein.

The foregoing description is intended to illustrate but not to limit the scope of the disclosure, which is defined by the scope of the appended claims. Other embodiments are within the scope of the following claims.

What is claimed:

1. An enclosure for an electronic device, the enclosure comprising:
    an encasement having a rear surface and a perimeter portion, the perimeter portion defined by a proximal end portion, a distal end portion, and a plurality of opposing side portions, the encasement further comprising:
        a first attachment element on the rear surface of the encasement; and
    a stand attached to the encasement, the stand comprising:
        a bi-stable springing element having a front surface, a rear surface, a first end region, a second end region, and a middle region positioned between the first end region and the second end region, wherein the bi-stable springing element has a first straight equilibrium position and a second curled equilibrium position, wherein the first end region, the middle region, and the second end region are arranged linearly in the first straight equilibrium position and the first end region and the second end region are curled inwardly towards each other in the second curled equilibrium position, the middle region at least partially encased by a rigid plastic formed around the middle region of the bi-stable springing element that maintains the middle region of the bi-stable springing element in a straightened configuration when the bi-stable springing element is in either the first straight equilibrium position or the second curled equilibrium position; and
        a second attachment element on a rear surface of the middle region of the stand, the second attachment element attached to the first attachment element.

2. The enclosure of claim 1, wherein the second attachment element comprises a plurality of slide protrusions, and wherein the first attachment element comprises a plurality of attachment apertures that receive and removably secure the slide protrusions.

3. The enclosure of claim 1, wherein the first attachment element comprises a plurality of slide protrusions, and wherein the second attachment element comprises a plurality of attachment apertures that each receive and removably secure one of the plurality of slide protrusions.

4. The enclosure of claim 1, wherein the second attachment element comprises a plurality of slide ledges on a perimeter of the middle region of the stand, and wherein the first attachment element comprises a plurality of attachment arms that removably secure the slide ledges protrusions when the second attachment element and the first attachment element engage.

5. The enclosure of claim 1, wherein the first attachment element is proximate a perimeter portion of the rear surface of the encasement.

6. The enclosure of claim 1, wherein the first end region and the second end region of the stand are each at least partially covered by an elastomeric material.

7. The enclosure of claim 1, wherein the bi-stable springing element of the stand is moveable between:
    an inactivated configuration, wherein the bi-stable springing element is positioned along the plane of the rear surface of the enclosure; and an activated configuration, wherein the bi-stable springing element curls away from the rear surface of the enclosure.

8. The enclosure of claim 1, wherein the stand further comprises a second bi-stable springing element, the second bi-stable springing element having a front surface, a rear surface, a first end region, and a second end region,
wherein the middle region comprises a rigid material attached to the second end region of the bi-stable springing element and the second end region of the second bi-stable springing element.

9. The enclosure of claim 8, wherein the second attachment element comprises a plurality of slide protrusions, and wherein the first attachment element comprises a plurality of attachment apertures that receive and removably secure the slide protrusions.

10. The enclosure of claim 8, wherein the first attachment element comprises a plurality of slide protrusions, and wherein the second attachment element comprises a plurality of attachment apertures that receive and removably secure the slide portions.

11. The enclosure of claim 8, wherein the second attachment element comprises a plurality of slide ledges on a perimeter of the middle portion, and wherein the first attachment element comprises a plurality of attachment arms that removably secure the slide ledges when the second attachment element and the first attachment element engage.

12. The enclosure of claim 8, wherein the first attachment element is proximate a perimeter portion of the rear surface of the encasement.

13. The enclosure of claim 8, wherein the first end region and the second end region of the stand are each at least partially covered by an elastomeric material.

14. The enclosure of claim 8, wherein the bi-stable springing element of the stand is moveable between:
an inactivated configuration, wherein the bi-stable springing element is positioned along the plane of the rear surface of the enclosure; and
an activated configuration, wherein the bi-stable springing element curls away from the rear surface of the enclosure.

15. The enclosure of claim 1, wherein the bi-stable springing element comprises an elongated structure having a first length along a first axis of the elongated structure and a second length along a second axis of the elongated structure perpendicular to the first axis, wherein the first length is longer than the second length, the bi-stable springing element having a shallow arch across the second axis of the bi-stable springing element, wherein the bi-stable springing element is configured to move from a first equilibrium position to a second equilibrium position upon depression of the shallow arch.

16. The enclosure of claim 15, wherein the bi-stable springing element is configured to move from the second equilibrium position to the first equilibrium upon application of a force against each of the first end region and the second end region to straighten the bi-stable springing element against the rear surface of the encasement.

17. The enclosure of claim 1, wherein the first end region and the second end region each comprises rounded edges.

18. The enclosure of claim 1, wherein the bi-stable springing element comprises one or more layers of thin metal at least partially covered by an elastomeric material.

19. The enclosure of claim 1, wherein the second attachment element comprises a plurality of L-shaped slide protrusions on a perimeter of the middle region, and wherein the first attachment element comprises a plurality of slide apertures that receive and removably secure the slide protrusions.

20. The enclosure of claim 1, wherein the second attachment element comprises one or more T-shaped slide protrusions, and wherein the first attachment element comprises one or more slide apertures that receive and removably secure the slide protrusions.

* * * * *

UNITED STATES PATENT AND TRADEMARK OFFICE
CERTIFICATE OF CORRECTION

PATENT NO.        : 9,874,260 B2  
APPLICATION NO.   : 14/558391  
DATED             : January 23, 2018  
INVENTOR(S)       : Alfred Blochlinger et al.

Page 1 of 1

It is certified that error appears in the above-identified patent and that said Letters Patent is hereby corrected as shown below:

In the Claims

Column 8, Line 54, the phrase "ledges protrusions" should read --ledges--.

Column 9, Line 21, the phrase "slide portions" should read --slide protrusions--.

Signed and Sealed this  
Thirteenth Day of March, 2018

Andrei Iancu  
*Director of the United States Patent and Trademark Office*